United States Patent [19]
Otto et al.

[11] 3,844,631
[45] Oct. 29, 1974

[54] UNITIZED THRUST BEARING AND INTERLOCKING SEAL ASSEMBLY THEREFOR

[75] Inventors: Dennis L. Otto, Malvern; Armando J. Vito, North Canton, both of Ohio

[73] Assignee: The Timken Company, Canton, Ohio

[22] Filed: June 25, 1973

[21] Appl. No.: 373,010

[52] U.S. Cl. .............................................. 308/187.1
[51] Int. Cl. ............................................. F16c 33/72
[58] Field of Search ........... 308/227, 231, 230, 232, 308/234, 233, 187.1

[56] References Cited
FOREIGN PATENTS OR APPLICATIONS
1,341,765  9/1963  France ................................ 308/227

Primary Examiner—Charles J. Myhre
Assistant Examiner—Frank Susko
Attorney, Agent, or Firm—Gravely, Lieder & Woodruff

[57] ABSTRACT

A thrust bearing is encapsulated in a seal assembly including a wear ring, in which one of the bearing races fits, and a seal case, in which the other bearing race fits. An eleastomeric seal element is bonded to the seal case and has a lip which engages a circumferential wall on the wear ring to form a seal for excluding contaminants from the interior of the bearing. The seal element interlocks with the wear ring to prevent the seal case and wear ring from being withdrawn from one another, and this unitizes the bearing. The wear ring and seal case have end walls provided with axially directed sealing fins for sealing against members between which the bearing assembly is fitted.

12 Claims, 4 Drawing Figures

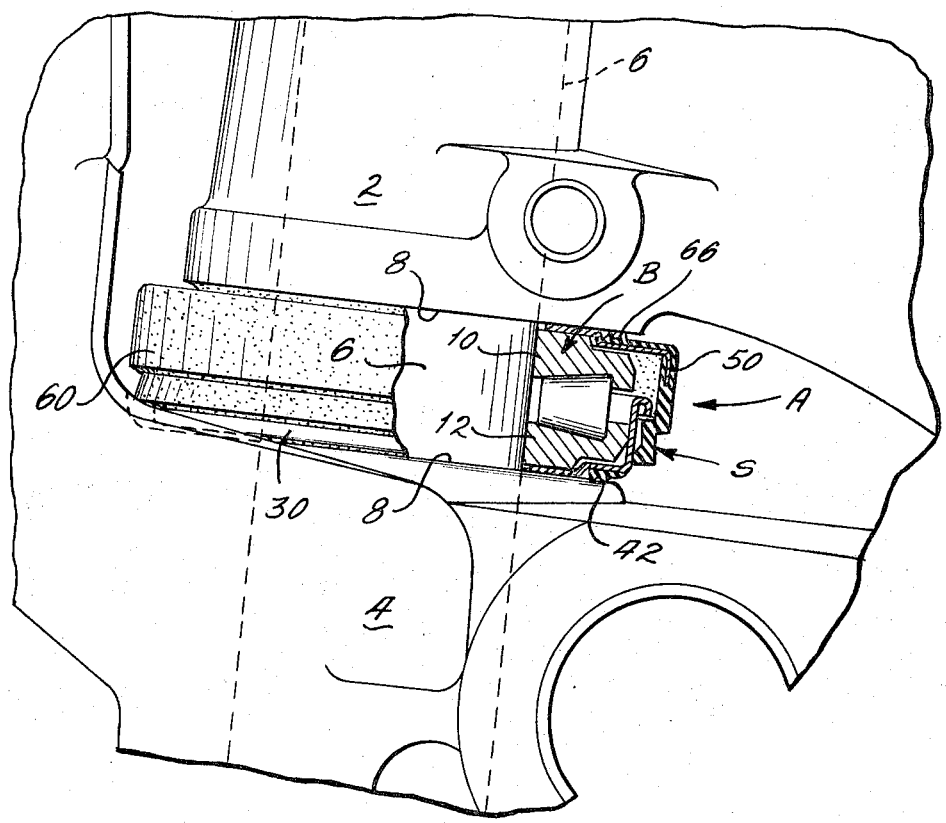
FIG.1
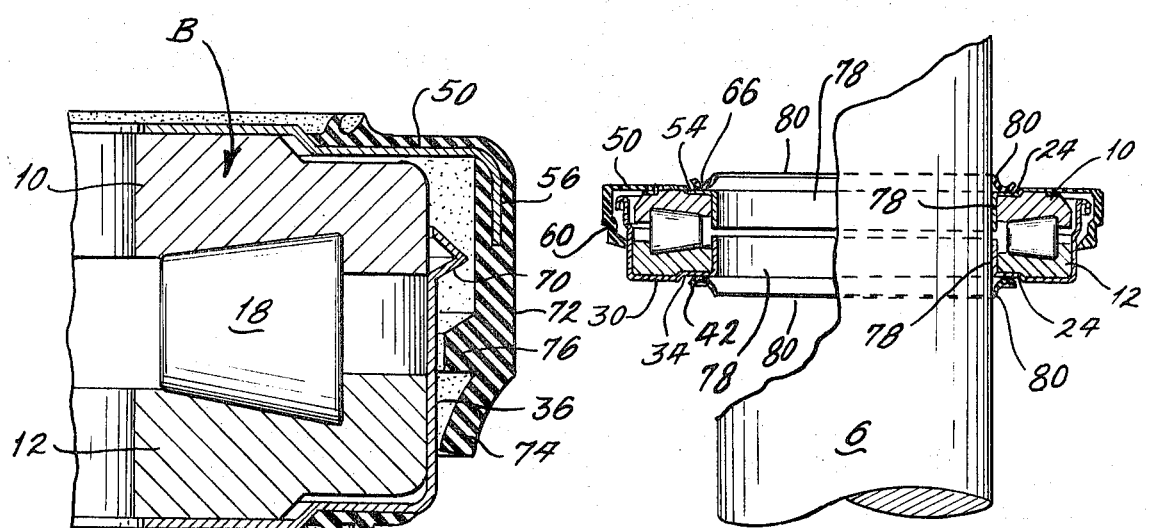
FIG.3
FIG.4

UNITIZED THRUST BEARING AND INTERLOCKING SEAL ASSEMBLY THEREFOR

BACKGROUND OF THE INVENTION

This invention relates in general to thrust bearings, and more particularly to a unitized thrust bearing assembly and an interlocking seal assembly for unitizing the thrust bearing.

In many applications for thrust bearings, it is desirable to have the bearing both unitized and sealed. Unitizing prevents the bearing assembly from falling apart prior to and during installation, and this of course, facilitates assembly into finished products. It also prevents loss of bearing components and contamination thereof prior to assembly. Sealing, on the other hand, prevents water, dirt, and other contaminants from entering the bearing and damaging the ground raceways and roller surfaces thereof. Sealing also keeps lubricants in the bearing.

One of the primary applications for smaller thrust bearings is in the front axles of heavy trucks. The steering knuckles, which carry the front wheel spindles, pivot about vertical king pins projected from the ends of the axle. The thrust bearings usually encircle the kin pins and are located such that the weight of the truck is transmitted from the axle through the bearings to the knuckles. Consequently, these bearings are exposed to rain as well as dust and other particulate matter, and it is therefore desirable to have the bearings sealed. They should also be unitized to facilitate assembly and disassembly of the axle.

Heretofore, thrust bearings of the type used in front axles of automotive vehicles have been unitized with stamped retainer rings which are closed after assembly of the bearing. The closure necessitates an additional closing operation during assembly. Such bearings can be sealed with seal elements which fit between the races and engage axially extending surfaces thereof. Because of the relatively large amount of end play in these bearings, conventional seals have not been too effective.

Aside from the foregoing, bearing arrangements of current construction usually require special seals which are set in place before or as the bearing is installed to prevent contaminants from entering the bearing over the top of or beneath it. These seals are usually cemented in place and therefore require additional labor to install. This adds to the overall cost of assembly.

SUMMARY OF THE INVENTION

One of the principal objects of the invention is to provide a seal assembly which both unitizes and seals antifriction thrust bearings. Another object is to provide a seal assembly of the type stated having two pieces which normally interlock, but may be easily separated to facilitate disassembly of the bearing. A further object is to provide a seal assembly which remains sealed notwithstanding large amounts of end play in the bearing. An additional object is to provide a seal assembly which establishes a seal against the members between which it is fitted. Still another object is to provide a seal assembly of the type stated which is easy to manufacture and assemble about a bearing. Yet another object is to provide a bearing assembly including a seal assembly of the type stated. These and other objects and advantages will become apparent hereinafter.

The present invention is embodied in a seal assembly having interlocking components which unitize a bearing and also seal the bearing. The invention further resides in the bearing assembly which is unitized and sealed by the seal assembly. The invention also consists in the parts and in the arrangements and combinations of parts hereinafter described and claimed.

DESCRIPTION OF DRAWINGS

In the accompanying drawings which form part of the specification and wherein like numerals and letters refer to like parts wherever they occur:

FIG. 1 is a fragmentary elevational view, partially broken away and in section, of the bearing assembly of the present invention installed between two members which pivot relative to each other;

FIG. 3 is a fragmentary sectional view of a modified bearing assembly; and

FIG. 4 is a sectional view of the bearing assembly of FIG. 1 with modifications.

DETAILED DESCRIPTION

Figure 2:
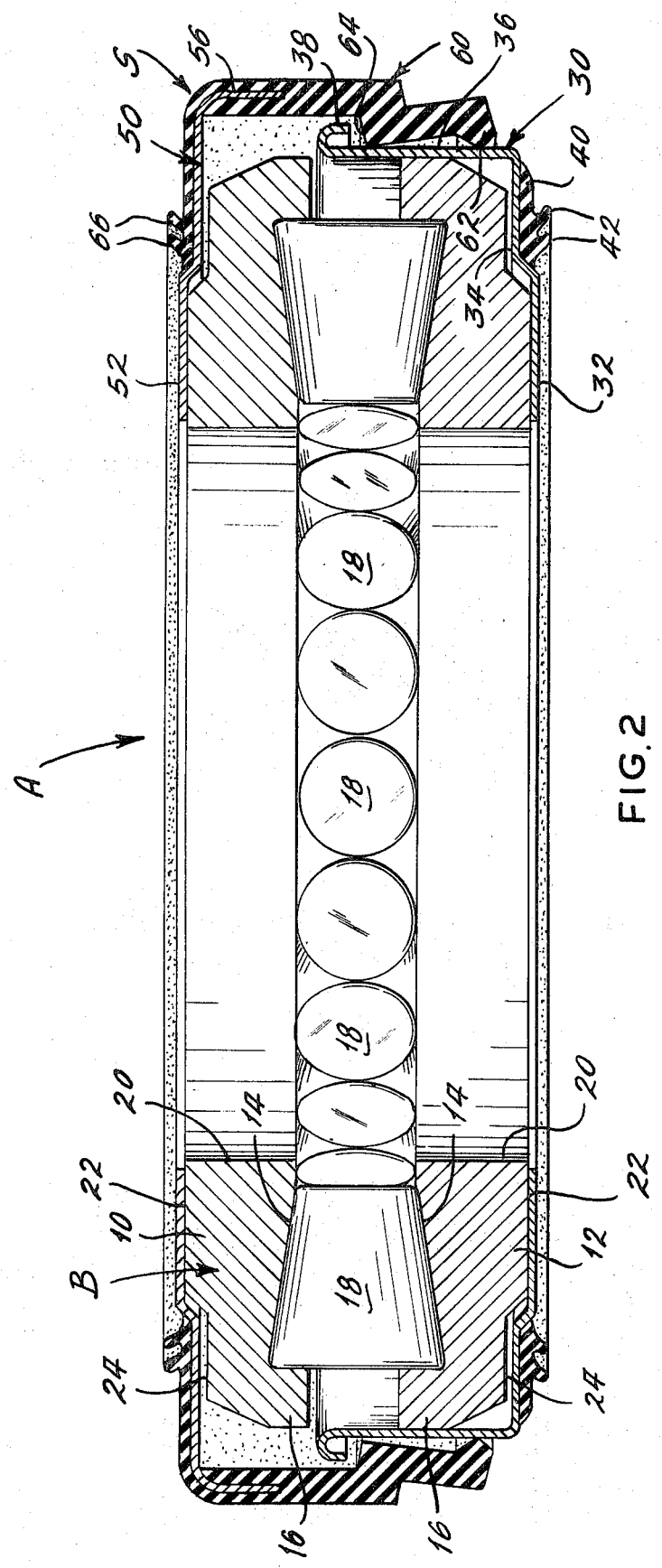
FIG. 2 is an enlarged sectional view of the bearing assembly.

Referring now to the drawings (FIG. 1), A designates a sealed thrust bearing assembly which is positioned between members 2 and 4. The member 4 pivots relative to the member 2 about a pin 6 which extends through both of the members 2 and 4 as well as through the bearing assembly A. Usually the pin 6 is positioned vertically, in which case the member 4 carries the weight of the member 2 as well as the weight of anything supported on the member 2, with that weight being transmitted through the thrust bearing assembly A. The upper member 2 may be the boss at the end of a front axle for a heavy truck, and in that instance the member 4 would be the lower yoke arm of the steering knuckle from which a front wheel spindle projects. The pin would be the king pin which extends through both yoke arms as well as through the axle boss. The downwardly presented surface of the member 2 and the upwardly presented surface of the member 4 are flat abutment surfaces 8 and engage opposite end faces of the bearing assembly A.

The bearing assembly A includes a tapered roller thrust bearing B (FIG. 2) having an upper race 10 positioned adjacent to the upper member 2 and an identical lower race 12 positioned adjacent to the lower member 4. Both races 10 and 12 have tapered raceways 14 and annular retaining shoulders or ribs 16 at the outer peripheries of the raceways 14. The two races 10 and 12 are separated by tapered rollers 18, having conical side faces which engage the raceways 14. The large diameter end faces of the rollers 18 bear against the retaining ribs 16 which prevent the rollers 18 from being expelled from the bearing B when the bearing B is loaded.

Each bearing race 10 and 12 is further provided with a center bore 20 through which the pin 6 fits and immediately outwardly from the center bore 20 has a planar end surface 22 surrounded by an annular recess 24 at the periphery of the race 10 or 12. The recesses 24 of the two races 10 and 12 open outwardly. Aside from the presence of the recesses 24 in the races 10 and 12, the thrust bearing B is conventional in construction.

In addition, to the thrust bearing B, the bearing assembly A also includes a seal assembly S (FIG. 2)

which encapsulates the bearing B and excludes contaminants therefrom. The seal assembly S includes a wear ring 30 which is a cupshaped metal stamping configured to snugly receive the lower race 12 of the bearing B. The wear ring 30 has a generally radially extending end or bottom wall 32 which fits between the planar end face 22 of the bearing race 12 and the flat abutment surface 8 of the lower member 4 and is apertured at its center to accommodate the pin 6. The bottom wall 32 near its periphery has an axially offset portion 34 which is deformed into the peripherial recess 24 on the bottom race 12, and this offset portion 34 is spaced from the flat abutment surface on the lower member 4. The offset portion 34 in turn merges into a circumferential wall 36 of cylindrical configuration and the diameter of this wall 36 is such that it snugly receives lower race 12. The wall 36 extends upwardly beyond upper surface of the lower race 12 and adjacent to the retaining rib 16 on the upper race 10, the wall 36 turns outwardly in the formation of a retention lip 38 which doubles back upon itself and forms the outermost portion of the wear ring 30. This retention lip 38 forms a radial offset on the circumferential wall 36.

Bonded to the axially offset portion 34 of the bottom wall 32 and also forming part of the wear ring 30 is an annular seal element 40 (FIG. 2) which is formed from an elastomeric material. The seal element 40 has sealing fins 42 which normally bear against the flat upper surface 8 on the lower member 4 and form a seal therewith to prevent contaminants from reaching the pin 6 (FIG. 1). When not deformed by the lower member 4, the fins 42 project generally axially slightly beyond planar lower surface of the bottom wall 32. However, it should be noted that the major portion of the seal element 40 is within the recess formed by the offset portion 34 and is further above the lowermost surface of the bottom wall 32 so as to provide a space into which the fins 42 will deform when brought against the flat upper surface of the lower member 4.

The seal assembly S also includes a seal case 50 (FIG. 2) which, like the wear ring 30, is a metal stamping of generally cup-shaped configuration. The wear ring 50 has an end or upper wall 52 which lies against the planar end surface 22 on the upper race 10 of the bearing B so that it is interposed between that surface and the flat downwardly presented surface 8 of the upper member 2. The upper wall 52 is apertured at its center to accommodate the pin 6 and has an axially offset portion 54 which is deformed downwardly into the peripheral recess 24 in the upper bearing race 10. The axially offset portion 54 projects radially beyond the circumferential wall 36 and retention lip 38 of the wear ring 30, and beyond the retention lip 38 as it merges into a downwardly extending circumferential wall 56 which generally encircles the upper race 10. The circumferential wall 56 terminates above the retaining lip 38 on the wear ring 30.

Bonded to the seal case 50 along both sides of its circumferential wall 56 as well as to the upper surface of its axially offset portion 54 is an elastomeric seal element 60 (FIG. 2) which projects downwardly beyond the retention lip 38 and encircles a major portion of the circumferential wall 36 on the wear ring 30. At its lower end the seal element 60 has a pair of beveled surfaces which converge to form an inwardly directed lip 62 engaged with the outer surface on the circumferential wall 36. When the seal element 60 is unrestrained, its diameter at the lip 62 is slightly less than outer diameter of the circumferential wall 36 so that the seal element 60 when fitted over the circumferential wall 36 will snugly embrace that wall at the lip 62 and form a water tight seal therewith for the purpose of excluding contaminants from the bearing B.

Slightly above the inwardly directed lip 62, the seal element 60 is provided with a shoulder 64 which underlies the retention lip 38 on the wear ring 30. The retention lip 38 and the shoulder 64 cooperate to unitize the bearing B, that is, to prevent the seal case 50 and the wear ring 30 from separating which in turn prevents the two races 10 and 12 of the bearing from separating. The clearance between the shoulder 64 and the lower end of the retention lip 38 should be such that the rollers 18 will not slip into center bores 20 of the races 10 and 12 and fall out of the bearing assembly A when the shoulder 64 is against the retention lip 38.

The portion of the elastomeric seal element 60 which is bonded to the offset portion 54 of the seal case 50 is for the most part disposed below the upwardly presented surface of the upper end wall 52, and adjacent to the inner margin of the offset portion 54, the seal element 60 is provided with sealing fins 66 which engage with the flat abutment surface 8 on the underside of the upper member 2 (FIG. 1). When not deformed, the fins 66 project generally axially beyond the upper surface on the upper wall 52. Hence, when the flat abutment surface 8 of the member 2 is brought against the upper wall 52, it will deform the fins 66 downwardly into the unoccupied space between the main body of the elastomeric seal element 60 and the plane of the upper surface on the upper wall 52.

To assemble the bearing assembly A, the bearing B is first assembled in the usual manner and the lower race 12 thereof is fitted into the wear ring 30. Then the seal case 50 is placed over the upper race 10, in which case the lowermost beveled surface on the inwardly directed lip 62 will come against the curved surface of the retention lip 38 on the wear ring 30. By urging the seal case 50 toward the wear ring 30, the downwardly projecting portion of the seal element 60 expands and rides over the retention lip 38. Once the shoulder 64 clears the retention lip 38, the downwardly projecting portion of the seal element 60 springs inwardly by virtue of its own resiliency, and the shoulder 64 moves behind retention lip 38, thus, unitizing the bearing B. Also, the inwardly directed lip 62 of the seal element 60 engages the outwardly presented surface of the circumferential wall 36 of the wear ring 30 to form a fluid tight seal therewith. The bearing assembly A is sold in this unitized condition.

The purchaser of the bearing assembly A installs it between the members 2 and 4 and fits the pin 6 through the aligned center bores 20 in the races 10 and 12 of the bearing B (FIG. 1). When so installed the sealing fins 66 of the seal element 60 will be deformed against the flat abutment 8 of the upper member 2, while the sealing fins 42 of the other sealing element 40 deform against the flat abutment surface 8 on the lower member 4, thus, forming fluid tight seals at the upper and lower ends of the bearing assembly A. This prevents water and other contaminants from seeping into the bearing B along the ends of the seal assembly A. Since the sealing fins 42 are located in the axially offset portion 34 of the wear ring 30, the flat abutment surface 8 of the lower member 4 can come directly against the bottom wall 32 of the wear ring 30. Thus, the thrust load transmitted by the bearing B does not pass through the elastomeric seal element 40. Indeed, the fins 42 are only deformed a slight amount, that is, enough to create an effective seal. The same is true of the sealing fins 66 on the elastomeric seal element 60 which is located in the offset portion 54 of the seal case 50. The light loading on the fins 42 and 66 greatly reduces the tendency for the fins 42 and 66 to take on a compression set and lose their effectiveness as seals.

Since the lip 62 of the seal element 60 engages an axially directed surface, that is the circumferential wall 56, the seal formed by the lip 62 is not affected by end play in the bearing B. The seal lip 62 merely slips along the circumferential wall in the axial direction to accommodate the end play. It still remains effective as a seal which is unlike conventional seals which operate along radially directed surfaces of thrust bearings.

The bearing assembly A is easily taken apart merely by expanding the seal element 60 and withdrawing the seal case 50 from the wear ring 30.

MODIFICATIONS

In a modified version of the interlocking seal assembly S (FIG. 3), the wear ring 30, instead of having an outwardly turned retention lip 38 which doubles back upon itself, is provided with an angled flange 70 at the upper end of the circumferential wall 36. The flange 70 is composed of two oblique segments, the first being directed obliquely outwardly from the circumferential wall 36 and the second being directed obliquely inwardly from the first. The second segment encircles the upper race 10 of the bearing B.

The seal case 50 of the modified version has a modified seal element 72 (FIG. 3) which like the seal element 60 is bonded to and extends downwardly from the circumferential wall 56 of the seal case 50. The seal element 72 has an oblique lip 74 which engages the outer surface of the circumferential wall 36 on the wear ring 30. It also has an integrally molded retention rib 76 above the lip 74 and this rib 76 underlies the flange 70, cooperating therewith to unitize the bearing B. Expanding the seal element 72 and rib 76 to clear the flange 70 permits assembly or disassembly of the modified bearing assembly A.

The wear ring 30 may be provided with a sleeve 78 (FIG. 4) which extends into the center bore of the lower race 12 and projects upwardly past the raceway 14 for that race 12. The sleeve 78 prevents the rollers 18 from sliding past the margins of the center bores 20 when the races 10 and 12 are spaced their maximum distance apart, and this in turn prevents those rollers from interferring the pin 6 when it is inserted through the bores 20. A similar sleeve 78 may be formed on the seal case 50. The sleeve 78 may be formed integrally or separate from the wear ring 30 or seal case 50, and is used primarily in a bearing B which does not have a cage and has a low included angle on its tapered rollers 18.

The sealing fins 42 and the offset portion 34 of the wear ring 30 may be located adjacent to the center bore 20 of that race 12 instead of outwardly therefrom (FIG. 4). Likewise, the sealing fins 66, and the offset portion 54 of the seal case 50 may be located adjacent to the center bore 20 of the upper race 10. Of course, the recess 24 of the bearing races 10 and 12 should then open into the center bores 20. When the sealing fins 42 and 66 are located adjacent to the center bores 20, the seal elements of which they are a part may have additional sealing fins 80 which embrace the side face of the pin 6.

This invention is intended to cover all changes and modifications of the example of the invention herein chosen for purposes of the disclosure which do not constitute departures from the spirit and scope of the invention.

What is claimed is:

1. A bearing assembly comprising: a thrust bearing having spaced apart first and second races provided with opposed raceways, and rolling elements interposed between and engageable with the raceways to enable one of the bearing races to rotate freely with respect to the other bearing race; a circumferential wall mounted generally coaxially with respect to the axis of rotation for the bearing and having a portion which is offset in the radial direction; an annular seal element mounted generally coaxially with respect to the axis of rotation for the bearing and extending past the radial offset on the circumferential wall, the seal element having a shoulder thereon which extends inwardly past the radial offset on the circumferential wall so that the radial offset and the shoulder will interfere when the circumferential wall and seal element are pulled apart, the seal element further engaging the circumferential wall and establishing a seal therewith, the seal element and the circumferential wall cooperating to seal the spaces between the two bearing races and to exclude contaminants therefrom.

2. A bearing assembly according to claim 1 wherein the circumferential wall surrounds the first race and the seal element surrounds the second race.

3. A bearing assembly according to claim 2 wherein the seal element is formed from an elastomeric material and encircles the circumferential wall, engaging the outwardly presented surface thereof.

4. A bearing assembly according to claim 3 wherein the radial offset on the circumferential wall projects outwardly from the circumferential wall.

5. A bearing assembly according to claim 3 wherein the circumferential wall forms part of a wear ring which receives the first bearing race and has an end wall which extends across the end of the first bearing race.

6. A bearing assembly according to claim 5 wherein the seal element is bonded to a seal case which receives the second bearing race and has an end wall extended across the end of the second race.

7. A bearing assembly according to claim 6 wherein at least one of the end walls has an elastomeric sealing element provided with generally axially extending fins which project beyond the end wall for engagement with a surface against which the bearing assembly is fitted.

8. A bearing assembly according to claim 7 wherein the end wall has axially offset portion and the sealing element is fitted into the offset portion.

9. A bearing assembly according to claim 6 wherein the seal case has an end wall provided with an axially offset portion; and wherein sealing fins project generally axially from the axially offset portion beyond the end wall for engagement with a surface against which the bearing assembly is fitted.

10. A bearing assembly according to claim 6 wherein the wear ring has an end wall to which the circumferential wall is connected and the end wall has an axially offset portion; and wherein the elastomeric sealing fins project generally axially from the axially offset portion beyond the wear ring end wall.

11. A bearing assembly according to claim 6 and further characterized by a sleeve extending through at least one of the bearing races and axially beyond the raceways of the race through which it extends.

12. A bearing assembly according to claim 11 wherein the sleeve is attached to one of the end walls.

* * * * *